United States Patent
Rao

(10) Patent No.: US 10,378,742 B1
(45) Date of Patent: Aug. 13, 2019

(54) ELECTRICAL CONNECTING SYSTEM CONFIGURED TO ELECTRICALLY CONNECT A PLURALITY OF LIGHTING FIXTURES AND METHOD

(71) Applicant: Litetronics International, Inc., Bedford Park, IL (US)

(72) Inventor: Raghu Rao, Romeoville, IL (US)

(73) Assignee: Lifetronics International, Inc., Bedford Park, IL (US)

( * ) Notice: Subject to any disclaimer, the term of this patent is extended or adjusted under 35 U.S.C. 154(b) by 0 days.

(21) Appl. No.: 16/142,346

(22) Filed: Sep. 26, 2018

(51) Int. Cl.
| | |
|---|---|
| *F21V 23/06* | (2006.01) |
| *F21K 9/23* | (2016.01) |
| *F21S 4/20* | (2016.01) |
| *H01B 13/012* | (2006.01) |
| *H01B 7/00* | (2006.01) |
| *F21V 23/00* | (2015.01) |
| *F21S 9/00* | (2006.01) |
| *F21Y 103/00* | (2016.01) |
| *F21Y 115/10* | (2016.01) |

(52) U.S. Cl.
CPC ............ *F21V 23/002* (2013.01); *F21K 9/23* (2016.08); *F21S 4/20* (2016.01); *F21S 9/00* (2013.01); *H01B 7/0045* (2013.01); *H01B 13/012* (2013.01); *F21Y 2103/00* (2013.01); *F21Y 2115/10* (2016.08)

(58) Field of Classification Search
CPC ...... F21V 23/001; F21V 23/002; F21V 23/06; F21V 21/005; F21S 4/20; F21S 4/22; F21S 4/28; F21S 9/00; H01B 7/0045; H01B 13/012; F21K 9/23; F21Y 2115/15
See application file for complete search history.

(56) References Cited

U.S. PATENT DOCUMENTS

| | | | | |
|---|---|---|---|---|
| 5,225,765 | A * | 7/1993 | Callahan | F21V 23/04 315/194 |
| 8,556,451 | B1 * | 10/2013 | Wilkinson | F21S 2/00 362/217.01 |
| 9,093,188 | B1 * | 7/2015 | Holland | H01R 11/00 |
| 9,337,598 | B1 * | 5/2016 | Baright | H01R 33/76 |
| 2002/0114155 | A1 * | 8/2002 | Katogi | F21S 2/00 362/219 |
| 2007/0274067 | A1 * | 11/2007 | Sloan | F21V 15/015 362/219 |
| 2011/0122620 | A1 * | 5/2011 | Zheng | F21S 2/005 362/249.02 |
| 2013/0122724 | A1 * | 5/2013 | Velazquez | F21S 2/00 439/39 |
| 2018/0295695 | A1 * | 10/2018 | Loomis | H05B 37/0254 |

* cited by examiner

*Primary Examiner* — Alan B Cariaso
(74) *Attorney, Agent, or Firm* — Witters & Associates; Steve Witters

(57) ABSTRACT

An electrical connecting system configured to electrically connect a plurality of lighting fixtures, wiring harness, and method are presently disclosed. The electrical connecting system has a first wiring harness configured to electrically connect with a sole external power supply and a first lighting fixture and a second wiring harness configured to electrically connect with a second lighting fixture and the first wiring harness. The electrical connecting system is configured to supply power to each lamp, in the plurality of lighting fixtures, with the sole external power supply.

20 Claims, 5 Drawing Sheets

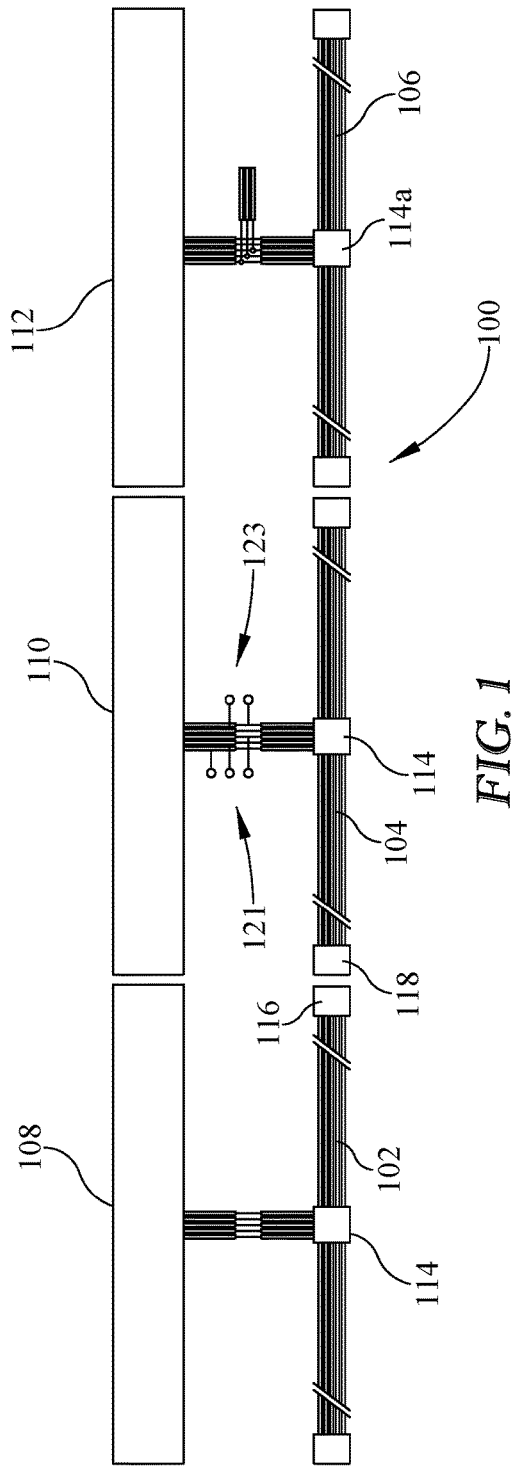
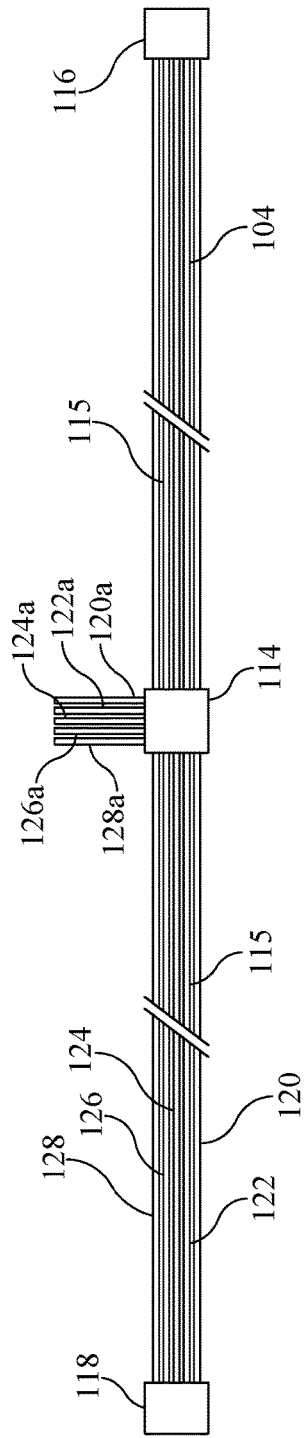
FIG. 1
FIG. 2

US 10,378,742 B1

ELECTRICAL CONNECTING SYSTEM CONFIGURED TO ELECTRICALLY CONNECT A PLURALITY OF LIGHTING FIXTURES AND METHOD

FIELD OF THE DISCLOSURE

This invention generally relates to lighting systems, and, more particularly, to an electrical connecting system configured to electrically connect a plurality of lighting fixtures and method.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Surface mounted and suspension mounted light fixtures, such as strip fixtures, have typically been installed to provide general lighting of large indoor spaces. For example, surface mount and strip light fixtures may include stem mounted, pendant mounted, and suspension mounted variations as well as those fixtures mounted directly to a ceiling or in the ceiling.

Typically, such strip fixtures include a channel in the form of an inverted box, trough, or troffer, with the channel being attached to, recessed in, or suspended from the ceiling. Power is typically supplied to each individual lighting fixture by wiring brought into the channel through the top or end of the channel. A plurality of strip lighting fixtures are often placed in a row, end to end, to provide desired lighting to a large area.

It may be desired to provide an electrical connecting system that does not require each individual lighting fixture, in a plurality of lighting fixtures, to be individually wired to an external power source.

SUMMARY

In at least one aspect of the present disclosure, an electrical connecting system configured to electrically connect a plurality of lighting fixtures to one another and a sole external power supply is disclosed. The electrical connecting system comprises a first wiring harness being configured to electrically connect with the sole external power supply and a first lighting fixture. The first wiring harness comprises a first wiring harness connector and a first power adapter, the first wiring harness connector and the first power adapter are in electrical connection with one another. A second wiring harness is configured to electrically connect with a second lighting fixture and the first wiring harness. The second wiring harness comprises a second wiring harness connector and a second power adapter. The second wiring harness connector and the second power adapter being in electrical connection with one another. Each of the lighting fixtures, in the plurality of lighting fixtures, comprises at least one lamp. The first power adapter is configured to electrically connect with the sole external power supply and electrically communicate with each of the lamps in the first lighting fixture. The second power adapter is configured to electrically communicate with each of the lamps in the second lighting fixture. The first wiring harness connector is configured to electrically connect with the second wiring harness connector. The electrical connecting system is configured to supply power to each lamp, in the plurality of lighting fixtures, with the sole external power supply.

In at least one other aspect of the present disclosure, a method of electrically connecting a plurality of lighting fixtures together is disclosed. The method comprises electrically connecting a first wiring harness to a sole external power supply and electrically communicating at least one lamp, in a first lighting fixture, with the sole external power supply. Electrically connecting a second wiring harness to a second lighting fixture and electrically communicating at least one lamp, in the second lighting fixture, with the second wiring harness. Electrically connecting the first wiring harness to the second wiring harness provides the lamps in the plurality of lighting fixtures power from the sole external power supply.

In at least one additional aspect of the present disclosure, a wiring harness is disclosed. The wiring harness comprises a first wiring harness connector having electrical lines extending therefrom and a second wiring harness connector having the electrical lines extending thereto. A power adapter has the electrical lines extending therethrough. The wiring harness is configured to electrically connect with an external power source and to electrically connect external power, supplied by the external power source, to the first wiring harness connector, the second wiring harness connector, and the power adapter.

BRIEF DESCRIPTIONS OF THE DRAWINGS

The following figures, which are idealized, are not to scale and are intended to be merely illustrative of aspects of the present disclosure and non-limiting. In the drawings, like elements may be depicted by like reference numerals. The drawings are briefly described as follows.

FIG. 1 is an illustrative schematic view of an electrical connecting system of the present disclosure;

FIG. 2 is an illustrative schematic view of a wiring harness of the present disclosure;

DETAILED DESCRIPTION

Figure 3:
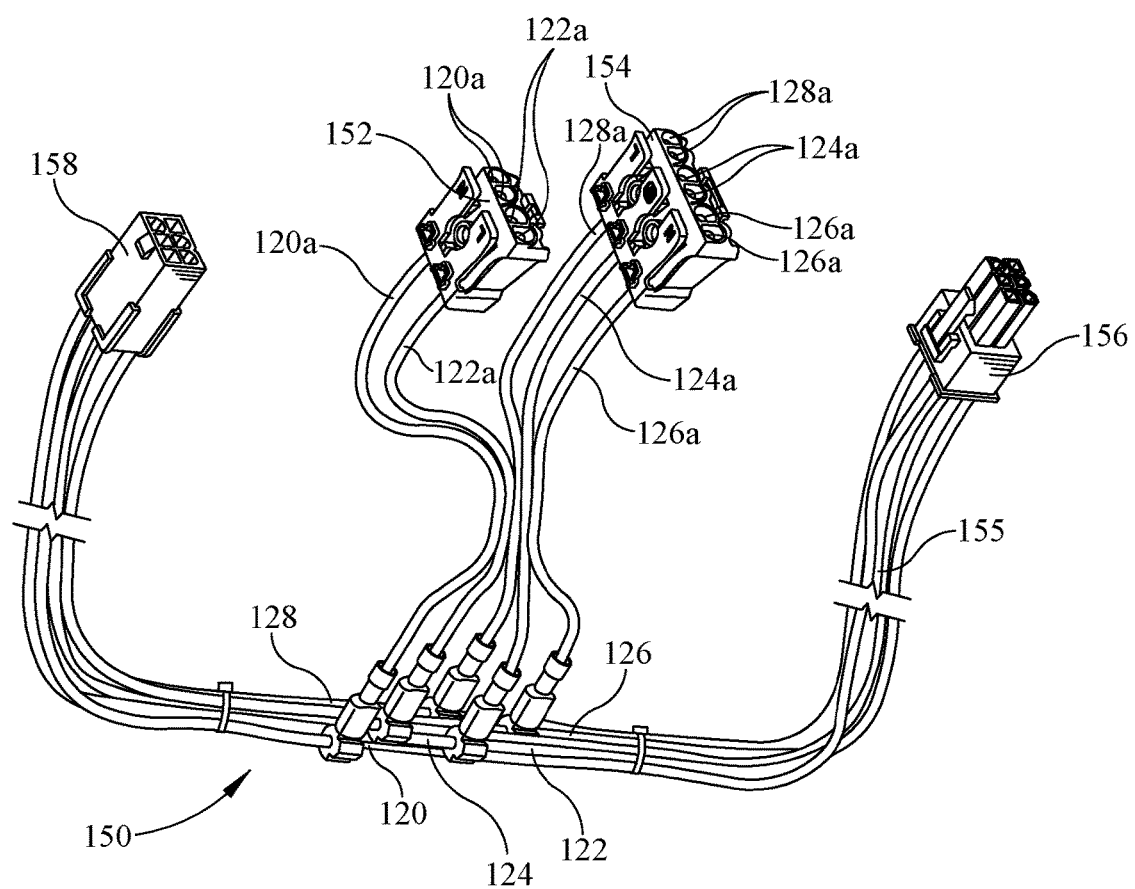
FIG. 3 is an illustrative view of a wiring harness of the present disclosure.

The presently disclosed electrical connecting system, wiring harness, and method may provide a means for electrically connecting a plurality of lighting fixtures together. For example, a sole power source may be electrically connected to the electrical connecting system of the present disclosure to power a plurality of lighting fixtures. In one illustrative embodiment, a row of strip lighting fixtures is powered by a sole external power supply.

For example, a plurality of strip lighting fixtures may be installed end to end. A wiring harness of the present disclosure may be installed into each lighting fixture. Each wiring harnesses may be placed in electrical communication with one or more lamps in the lighting fixture in which the wiring harness is installed. Each wiring harness may be electrically connected to each other. A sole external power supply may be electrically connected to one of the wiring harnesses, in a series of interconnected wiring harnesses.

Lighting controls, such as a dimmer, may be provided with the electrically connecting system of the present disclosure. For example, the electrical connecting system of the present disclosure may be configured electrically connect one of the wiring harnesses, in a daisy chain series of connected wiring harnesses, to a sole external dimming control and electrically communicate a plurality of lighting fixtures with the sole external dimming control.

Reference will now be made in detail to the present exemplary embodiments and aspects of the present invention, examples of which are illustrated in the accompanying figures. Similar reference numbers may be used in the figures to refer to the same or like parts. The presently disclosed embodiments, aspects, and features of the present invention are not to limit the presently claimed invention as other and different embodiments, aspects, and features will become apparent to one skilled in the art upon reading the present disclosure.

FIG. 1 shows an illustrative schematic view of electrical connecting system 100. Electrical connecting system 100 is configured to electrically a plurality of lighting fixtures together, for example, lighting fixtures 108, 110, and 112. Each lighting fixture 108, 110, and 112 has a wiring harness 102, 104, and 106, respectively, electrically connected therewith. Each wiring harness 102, 104, and 106 has a power adapter 114 electrically connected to each lighting fixture 108, 110, and 112.

Each wiring harness 102, 104, and 106 has at least one wiring harness connector 116 and 118, electrically connecting each adjacent wiring harness. Sole external power supply lines 121 are electrically connected to one of the wiring harnesses, 102, 104, or 106. Optionally, lighting controls, such as dimmer controls 123, may be electrically connected to one of the wiring harnesses, 102, 104, or 106.

In at least one embodiment of the present disclosure, electrical connecting system 100 is configured to electrically connect a plurality of lighting fixtures, 108, 110, and 112, to one another and a sole external power supply 121. A first wiring harness, for example wiring harness 104, is configured to electrically connect with sole external power supply 121 and a first lighting fixture, for example lighting fixture 110. The first wiring harness 104 has first wiring harness connector 116 and a first power adapter 114.

First wiring harness connector 116 and first power adapter 114 are in electrical connection with one another. Second wiring harness 106 is configured to electrically connect with second lighting fixture 112 and first wiring harness 104. Second wiring harness 106 has a second wiring harness connector 118 and a second power adapter 114*a*. Second wiring harness connector 118 and second power adapter 114*a* are in electrical connection with one another. Each of the lighting fixtures, in the plurality of lighting fixtures, lighting fixtures 110 and 112 for example, has at least one lamp.

First power adapter 114 is configured to electrically communicate with each of the lamps in first lighting fixture 110 and second power adapter 114*a* is configured to electrically communicate with each of the lamps in second lighting fixture 112. One of first wiring harness 104 and second wiring harness 106 is configured to electrically connect with sole external power supply 121. For example, first wiring harness 104 may be configured to connect with sole external power supply 121, as shown in FIG. 1.

First wiring harness connector 116 is configured to electrically connect with second wiring harness connector 118. Electrical connecting system 100 is configured to supply power to each lamp, in the plurality of lighting fixtures, for example lamp(s) in lighting fixtures 110 and 112, with sole external power supply 121.

Optionally, wiring harness 104 may be configured to connect with an external controller, such as sole external dimming control 123, and electrically communicate dimming control to each lighting fixture in the plurality of connected lighting fixtures. For example, first wiring harness 104 may have a first dimmer adapter, which may be a part of, or separate from, first power adapter 114, and second wiring harness 106 may have a second dimmer adapter, which may be a part of, or separate from, second power adapter 114*a*. First wiring harness 104 may be configured to electrically connect with a sole external dimming controller, for example external control interface 123, and electrically communicate with each lamp in the first lighting fixture 110. Second dimmer adapter, which may be a part of second power adapter 114*a*, may be configured to electrically communicate with each lamp in second lighting fixture 112. First wiring harness connector 116 and second wiring harness connector 118 may be configured to electrically connect with one another. First wiring harness connector 116 and second wiring harness connector 118 may be configured to control dimming of each of the lamps, in the plurality of lighting fixtures, with sole external dimmer control 123.

FIG. 2 shows an illustrative schematic view of wiring harness 104. Wiring harness 104 has a power adapter 114, first wiring harness connector 116, and second wiring harness connector 118. Power adapter 114, first wiring harness connector 116, and second wiring harness connector 118 are each in electrical connection with each other.

For example, wiring harness 104 may have first wiring harness connector 116 which may have electrical lines 115 extending therefrom. Second wiring harness connector 118 may have electrical lines 115 extending thereto. Power adapter 114 may have the electrical lines extending 115 therethrough. In at least one embodiment, power adapter 114 has electrical lines 115 extending therefrom and serves as a splitter of electrical lines 115. Wiring harness 104 may be configured to electrically connect with an external power source, such as sole external power supply 121, and to electrically connect external power, supplied by sole external power supply 121, to first wiring harness connector 116, second wiring harness connector 118, and power adapter 114.

In at least one embodiment, wiring harness 104 has wire connectors in power adapter 114 configured for connecting with an external power source. Wiring harness 104 may have first wiring harness connector 116 configured to electrically connect with second wiring harness connector 118. Wiring harness 104 may have a dimmer adapter, the dimmer adapter may be configured to electrically connect to an external dimming controller 123, first wiring harness connector 116, and second wiring harness connector 118.

For example, wiring harness 104 may have a plurality of electrical lines 115 extending through and from power adapter 114. In at least one embodiment, electrical lines extending through power adapter 114 has dimmer (N) 120, dimmer (L) 122, Ground 126, AC line (N) 124, and AC line (L) 128, wherein N denotes neutral and L denotes live. In at least one other embodiment, electrical lines extending from power adapter 114 has dimmer (N) 120a, dimmer (L) 122a, Ground 126a, AC line (N) 124a, and AC line (L) 128a.

Electrical lines 115 may terminate with first wiring harness connector 116 and second wiring harness connector 118. Power adapter 114 may function as a splitter and wiring harness 104 may have first wiring harness connector 116 and second wiring harness connector 118 in electrical connection with each other and with lines 120a, 122a, 124a, 126a, and 128a, extending from power adapter 114.

FIG. 3 is an illustrative view of wiring harness 150 of the present disclosure. In at least one embodiment of the present disclosure, wiring harness 150 has a power adapter 154, control adapter 152, first wiring harness connector 156, and second wiring harness connector 158. Control adapter 152 may be configured for connecting dimming control to each of the lamp fixtures connected with wiring harnesses 150. Power adapter 154, first wiring harness connector 156, and second wiring harness connector 158 are each in electrical connection with each other. Control adapter 152, first wiring harness connector 156, and second wiring harness connector 158 are each in electrical connection with each other.

For example, wiring harness 150 may have first wiring harness connector 156 which may have electrical lines 120, 122, 124, 126, and 128 extending therefrom and second wiring harness connector 158 may have electrical lines electrical lines 120, 122, 124, 126, and 128 extending thereto. Electrical lines 120, 122, 124, 126, and 128 may each be split. For example, electrical lines 124, 126, and 128 may be split to extend electrical lines 124a, 126a, and 128a to power adapter 154. Electrical lines 120 and 122 may be split to extend electrical lines 120a and 122a to control adapter 152.

Power adapter 154 is configured to electronically communicate with at least one lamp in a lamp fixture and may be configured to electrically connect with an external power source or supply. For example, each line 124a, 126a, and 128a leading into power adapter 154 may be split into two and provide for electrical communication with lamp(s) in a lighting fixture and an external power source. Similarly, each line 120a and 122a leading into control adapter 152 may be split into two and provide for electrical communication with lamp(s) in a lighting fixture and an external controller.

Figure 4:
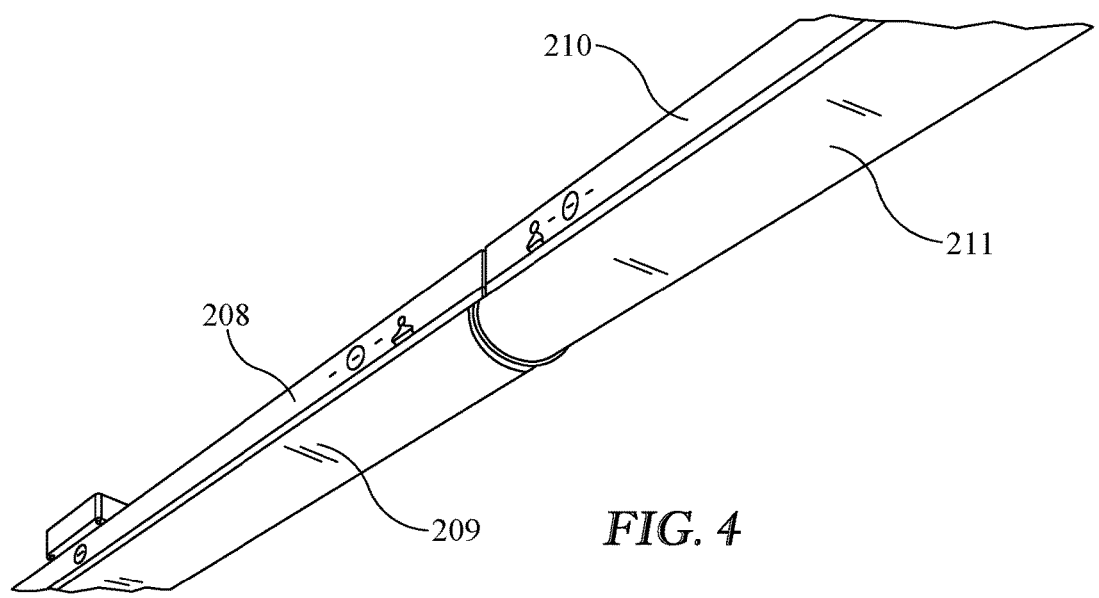
FIG. 4 shows an illustrative example of an application of the electrical connecting system of the present disclosure.

FIG. 4 shows an illustrative example of an application of the electrical connecting system of the present disclosure. The presently disclosed wiring harness may be configured to electrically connect, or daisy chain, a plurality of strip lighting fixtures together, end to end. For example, the presently disclosed electrical connecting system may be configured to electrically connect lighting fixture 208 to lighting fixture 210, end to end. Lighting fixture 208 may have one or more lamps 209 and lighting fixture 210 may have one or more lamps 211. Lighting fixtures 208 and 210 may have a length substantially greater than a width. For example, lighting fixtures 208 and 210 may have a length of about 2, 4, 6, 8, or 10 feet, or longer or shorter in fractions of a foot. In at least one embodiment of the present disclosure, electrical lines 120, 122, 124, 126, and 128 have a length extending between first wiring harness connector, 116 or 156, and second wiring harness connector, 118 or 158, sufficient to electrically connect two adjacently, end to end, abutted lighting fixtures 208 and 210 together. For example, electrical lines 120, 122, 124, 126, and 128 may have a length at least as great as about 2, 4, 6, 8, or 10 feet, or longer or shorter in inch, or fractions of an inch, increments. In at least one embodiment, lighting fixtures 208 and 210 have a length of at least 4 feet.

In at least one embodiment of the presently disclosed electrical connecting system, the presently disclosed wiring harness is configured convey power to a plurality of lighting fixtures 208 and 210 and illuminate a plurality of lamps 209 and 211. For example, two, three, or more lighting fixtures may be interconnected and a sole power supply connection may illuminate each lamp in each lighting fixture. Each lighting fixture may have one or more lamps. For example, lighting fixture 208 may have a plurality of lamps 209 housed therewith.

In at least one embodiment of the present disclosure, wiring harness 150 has a length between wiring harness connector 156 and wiring harness connector 158 for plugging together a plurality of longitudinal extending strip lighting fixtures. For example, lighting fixtures 208 and 210 may be strip fixtures having a length substantially greater than a width. In at least one embodiment of the present disclosure, lighting fixtures 208 and 210 have a length greater than 2 foot. In at least one other embodiment of the present disclosure, lighting fixtures 208 and 210 have a length of about 4 foot, 6 foot, 8 foot, or longer or shorter in fractions of a foot. For example, electrical lines 115, extending between wiring harness connector 156 and wiring harness connector 158, may have a length in excess of about 2 foot, 4 foot, 6 foot, 8 foot, or longer or shorter. In at least one embodiment of the present disclosure, electrical lines 155 have a length of at least 4 feet. For example, wiring harness 150 may be configured to be substantially housed in a strip lighting fixture, 208 and 210, and have at least one of wiring harness connector 156 and wiring harness connector 158 extend out of a longitudinal end of a strip lighting fixture 208 or 210 and plug into an wiring harness connector 156 or 158 of an adjacent wiring harness 150, housed in an adjacent lighting fixture, 208 or 210.

The number of lighting fixtures that may be powered with the sole power supply connection with the electrical connecting system of the present disclosure may be dependent upon the wattage requirement of each of the electrical connected lighting fixtures. For example, the presently disclosed electrical connecting system may be configured to illuminate about 55 lighting fixtures having 24 watt each, about 44 lighting fixtures having 30 watt each, about 33 lighting fixtures having 40 watt each, about 26 lighting fixtures having 50 watt each, or about 20 lighting fixtures having 64 watt each, with a sole power supply connection. For example, a daisy chain of connected wiring harnesses of the presently disclosure may carry in excess of 1000 watts. In at least one embodiment of the present disclosure, the wiring harness of the present disclosure may carry up to about 1400 watts, or more. It is to be understood that the electrical system of the present disclosure may be configured to carry less than 25 watts or more than 1400 watts, in increments of a fraction of a watt.

FIGS. 5a-5f show a method of electrically connecting a plurality of lighting fixtures together in a daisy chain fashion. The lighting fixtures being fitted with the presently disclosed electrical connecting system may be opened with a release of an end of bracket 230. A first wiring harness 150 may be electrically connected to a sole external power supply 221 and electrically communicate at least one lamp 209, in a first lighting fixture 208, with sole external power supply 221. Electrical communication may be made with a driver 225 for lighting at least one LED lamp.

For example, power adapter 154 may have a ground 126a, an AC line (N) 124a, and an AC line (L) 128a, leading to or from wiring harness 150. Power adapter 154 may be configured to split each of the lines from wiring harness 150 for connecting each to an external power supply and to power the lamps in the light fixture in which the wiring harness is installed or housed. A sole external power source may have a ground, AC line (N), and AC line (L), wherein N denotes neutral and L denotes live.

For example, power adapter 154 may be configured for electrically connecting ground 126a with ground 126b for powering the lighting fixture in which it is housed. For example, ground 126b may lead to a driver 225. Power adapter 154 may be configured for electrically connecting ground 126a with ground 126c for connecting with a sole external ground.

Power adapter 154 may be configured for electrically connecting AC line (N) 124a with AC line (N) 124b for powering the lamps in the lighting fixture in which it is housed. For example, AC line (N) 124b may lead to a driver 225. Power adapter 154 may be configured for electrically connecting AC line (N) 124a with AC line (N) 124c for connecting with a sole external AC line (N).

Power adapter 154 may be configured for electrically connecting AC line (L) 128a with AC line (L) 128b for powering the lamps in the lighting fixture in which it is housed. For example, AC line (L) 128b may lead to a driver 225. Power adapter 154 may be configured for electrically connecting AC line (L) 128a with AC line (L) 128c for connecting with a sole external AC line (L).

Wiring harness 150 may be configured for conveying lighting controls, such as a dimmer. Wiring harness 150 may have power adapter 154 configured for conveying lighting controls or may have a separate control adapter, such as dimmer control adapter 152. A sole external controller may have a dimmer (N) and dimmer (L) leading from a controller or a dimmer to a lighting fixture, in a plurality of electrically connected lighting fixtures, connected with the presently disclosed wiring harness. For example, wiring harness 150 may be configured to connect with dimmer control lines 223.

For example, dimmer control adapter 152 may be configured for electrically connecting dimmer (N) 120a, leading to or from wiring harness 150, with dimmer (N) 120b for controlling, or dimming, the lamps in the lighting fixture in which it is housed. For example, dimmer (N) 120b may lead to a driver 225. Dimmer control adapter 152 may be configured for electrically connecting dimmer (N) 120a with dimmer (N) 120c for connecting with a sole external dimmer (N).

Dimmer control adapter 152 may be configured for electrically connecting dimmer (L) 122a, leading to wiring harness 150, with dimmer (L) 122b for controlling, or dimming, the lamps in the lighting fixture in which it is housed. For example, dimmer (L) 122b may lead to a driver 225. Dimmer control adapter 152 may be configured for electrically connecting dimmer (L) 122a with dimmer (L) 122c for connecting with a sole external dimmer (L).

Figure 5A:
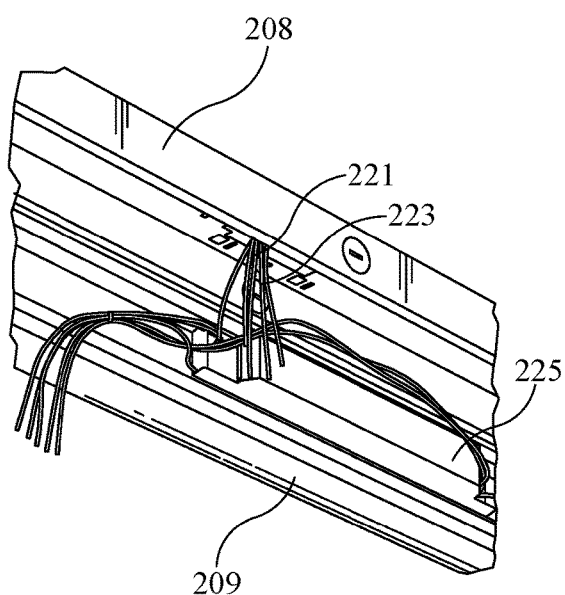
FIG. 5a shows a lighting fixture having a lamp, driver, and control and power lines for electrically connecting in accordance with a method of the present disclosure.
Figure 5B:
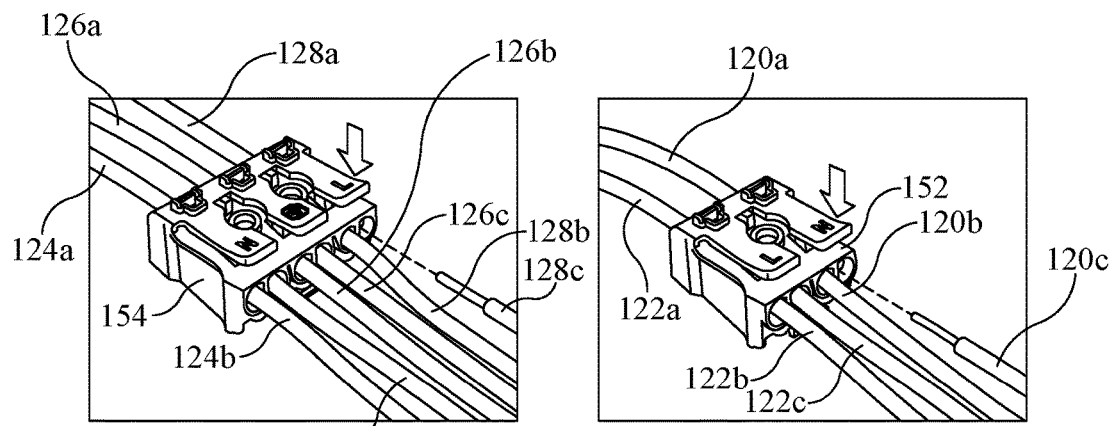
FIG. 5b shows electrically connecting a wiring harness to a sole external power supply, control lines, and a lighting fixture in accordance with a method of the present disclosure.

FIG. 5b shows electrically connecting a first wiring harness 150 to a sole external power supply 121 with the connection of external ground 126c, external AC line (N) 124c, and external AC line (L) 128c to power adapter 154. Power adapter 154 may be configured to receive bared ends of wires and provide the electrical connections. Electrically communication with at least one lamp 209, in a first lighting fixture 208, with the sole external power supply may be achieved by connecting fixture AC line (N) 124b, fixture ground 126b, and fixture AC line (L) 128b to power adapter 154.

In an embodiment of the wiring harness of the present disclosure having an external lighting control, such as a dimmer control, connection of the first wiring harness 150 to a sole external dimming control and electrically communicating at least one lamp 209, in first lighting fixture 208, with the sole external dimming control or dimmer control lines 223, may be performed by connecting external dimmer (L) 122c and external dimmer (N) 120c to control adapter 152. Electrical communication with at least one lamp 209 may be performed by connecting control adapter 152 with fixture dimmer (L) 122b and fixture dimmer (N) 120b. Fixture dimmer (L) 122b and fixture dimmer (N) 120b may lead from a driver 225 housed in the lighting fixture.

Electrically connecting a second wiring harness 150a to a second lighting fixture 210 and electrically communicating at least one lamp 211, in second lighting fixture 210 may be performed by connecting fixture 210 AC line (N) 124b, fixture 210 ground 126b, and fixture 210 AC line (L) 128b, each leading to second lighting fixture 210, to a power adapter 154 in a second wiring harness 150a.

In the embodiment of the wiring harness of the present disclosure having an external lighting control, such as a dimmer control, electrically communication of at least one lamp 211, in second lighting fixture 210, may be performed by connecting second wiring harness 150a adapter 152 with second fixture dimmer (L) 122b and second fixture dimmer (N) 120b. Second fixture dimmer (L) 122b and second fixture dimmer (N) 120b may lead from a second driver 225 housed in the second lighting fixture 210.

Each lighting fixture may be electrically connected together to power and control each of the lamps in the connected series of lighting fixtures by connecting the first wiring harness 150 with the second wiring harness 150a. The presently disclosed electrical connecting system may have a plurality of wiring harness 150 which may have the same, or similar, configurations and may be shown in the figures as wiring harness 150. A second wiring harness, in a plurality of wiring harnesses may be referenced herein as second wiring harness 150a.

For example a first wiring harness 150 may have a wiring harness connector 158 and a second wiring harness 150a may have a wiring harness connector 156. Wiring harness connectors 156 and 158 may be configured to connect with one another. For example, wiring harness connector 156 may be a male or female plug and wiring harness connector 158 may be the other of the male or female plug. Wiring harness connectors 156 and 158 may be configured to connect AC line (N), ground, and AC line (L) of the first wiring harness 150 with AC line (N), ground, and AC line (L) of the second wiring harness 150a. Additionally, wiring harness connectors 156 and 158 may be configured to connect dimmer (L) and dimmer (N) of first wiring harness 150 with dimmer (L) and dimmer (N) of second wiring harness 150a.

Upon connecting wiring harness connector 156 of first wiring harness 150 with wiring harness connector 158 of second wiring harness 150a, lamps 209 in first lighting fixture 208 are in electrical communication with sole external power supply lines 221 through first wiring harness 150. Lamps 211 in second lighting fixture 210 are in electrical communication with sole external power supply lines 221 through first wiring harness 150 and second wiring harness 150a.

Similarly, lamps 209 in first lighting fixture 208 may be in electrical communication with a sole external dimming control, via dimmer (L) 122c and dimmer (N) 120c, through first wiring harness 150. Lamps 211 in second lighting fixture 210 may be in electrical communication with the sole external dimming control lines dimmer (L) 122c and dimmer (N) 120c through first wiring harness 150 and second wiring harness 150a.

Second wiring harness 150a may be void of any external connections such as external ground 126c, external AC line (N) 124c, external AC line (L) 128c, dimmer (L) 122c, and dimmer (N) 120c. In an embodiment where the first and second wiring harness 150a have the same configuration, which may be desirous for production and supply, the sites for connection of external ground 126c, external AC line (N) 124c, external AC line (L) 128c, external dimmer (L) 122c, and external dimmer (N) 120c to second wiring harness 150a may remain open or unused. For example, only a single or sole external connection need be made to power, or control, a plurality of lighting fixtures connected together with the presently disclosed electrical connecting system.

Figure 5C:
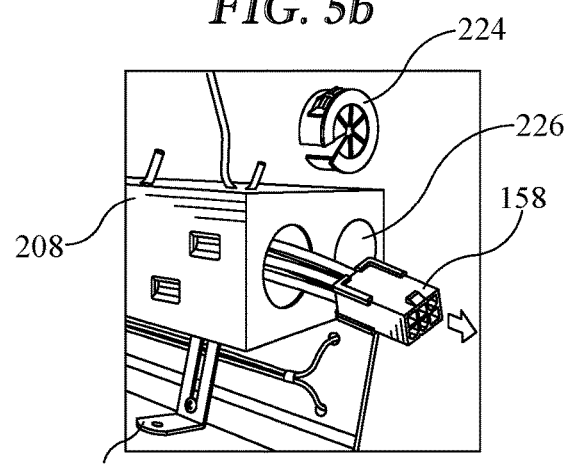
FIG. 5c shows a wiring harness connector extending out of a lighting fixture through a knockout in accordance with a method of the present disclosure.
Figure 5D:
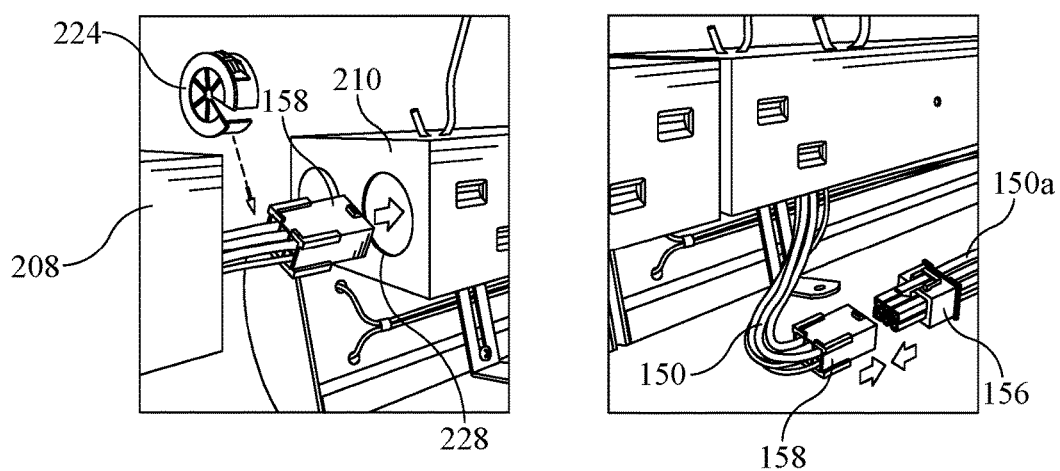
FIG. 5d shows a wiring harness connector extending from a first lighting fixture and to a second lighting fixture in accordance with a method of the present disclosure.

As shown in FIGS. 5c and 5d, first wiring harness 150 may have wiring harness connector 158 configured to extend through knockouts 226 in adjacently aligned knockout openings 228 in first lighting fixture 208 and second lighting fixture 210. An electrical connection may be made between first wiring harness 150 and second wiring harness 150a by extending wiring harness connector 158 through knockout openings 228 and plugging wiring harness connector 158, of first wiring harness 150, with wiring harness connector 156, of second wiring harness 150a.

Figure 5E:
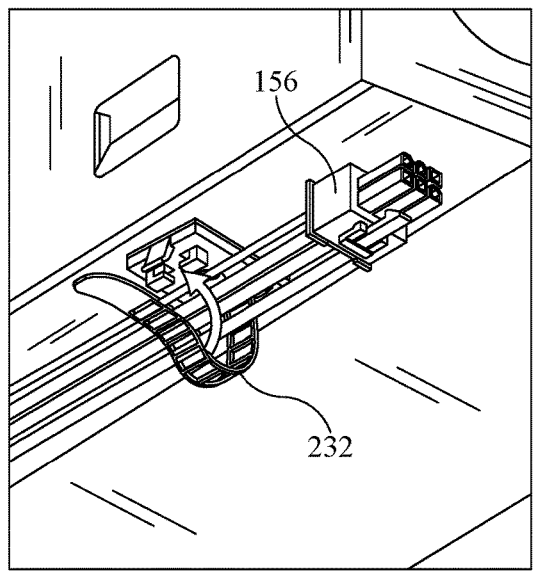
FIG. 5e shows a wiring harness held in a lighting fixture for housing therein in accordance with a method of the present disclosure.
Figure 5F:
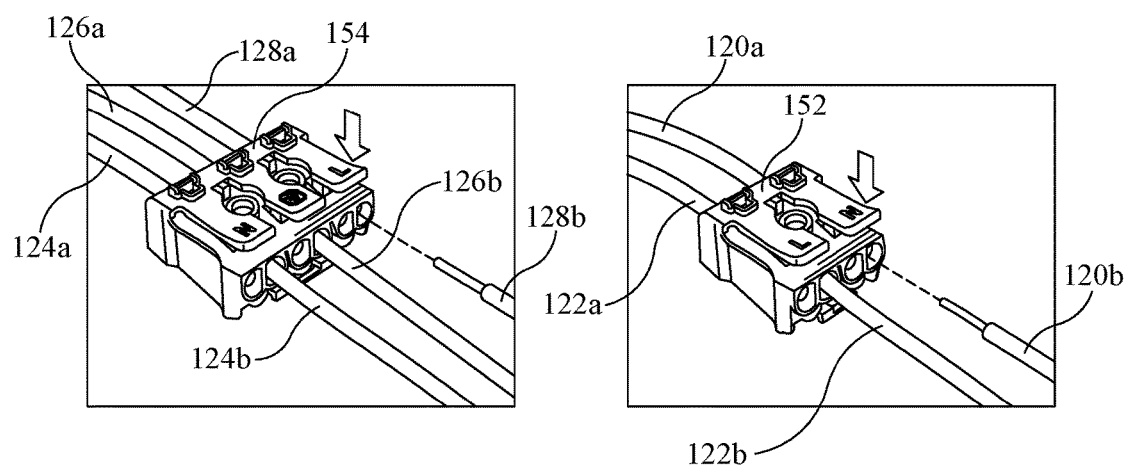
FIG. 5*f* shows electrically connecting a dimmer control adapter and a power adapter to a lighting fixture in accordance with a method of the present disclosure.

Grommets 224 may be placed into knockout openings 228 and about electrical lines 155. As shown in FIG. 5e, first wiring harness 150 may be configured to be housed and held in first lighting fixture 208 with ties 232. Second wiring harness 150a may be configured to be housed and held in second lighting fixture 210 with ties 232.

In at least one embodiment of the present disclosure, a method of electrically connecting a plurality of lighting fixtures, 208 and 210, is provided. Lighting fixtures 208 and 210 may be opened with removal of a portion of bracket 230 form the lighting fixture housing. An electrical connection of a first wiring harness 150 to a sole external power supply and electrical communication with at least one lamp 209, in a first lighting fixture 208, with the sole external power supply may be achieved with the connection of electrical lines 124b, 126b, 128b, 124c, 126c, and 128c to power adapter 154.

An electrical communication of a second wiring harness 150a with at least one lamp 211, in a second lighting fixture 210 may be made with the connection of electrical lines 124b, 126b, and 128b, to power adapter 154 of second wiring harness 150a. An electrical connection of first wiring harness 150 to the second wiring harness 150a may be made by connecting wiring harness connector 156, of first wiring harness 150, with wiring harness connector 158, of second wiring harness 150a. In at least one embodiment, the connecting of wiring harness connector 156, of first wiring harness 150, with wiring harness connector 158, of second wiring harness 150a, comprises plugging wiring harness connectors 156 and 158 together.

An electrical connection of the plurality of lighting fixtures may also include a connection of an external control, such as a dimmer control, to the plurality of lighting fixtures. For example, a connection of first wiring harness 150 to a sole external dimming control and electrically communicating the at least one lamp 209, in the first lighting fixture 208, with the sole external dimming control, may be performed with the connection of electrical lines 120b, 122b, 120c, and 122c to dimmer control adapter 152, of first wiring harness 150. An electrical communication of second wiring harness 150a to at least one lamp 211, in the second lighting fixture 210, may be performed with the connection of electrical lines 120b and 122b to dimmer control adapter 152, of second wiring harness 150a.

An electrically communication of at least one lamp 211, in the second lighting fixture 210, with the sole external dimming control, may be made with the connection of wiring harness connector 156, of first wiring harness 150, with wiring harness connector 158, of second wiring harness 150a.

Wiring harness connector 156, of first wiring harness 150, or wiring harness connector 158, of second wiring harness 150a, may be extended through openings 228 in first lighting fixture 208 and second lighting fixture 210. First wiring harness 150 may be substantially housed in the first lighting fixture 208 and second lighting wiring harness 150a may be substantially housed in the second lighting fixture 210. Grommets 224 may be inserted in openings 228 in first lighting fixture 208 and second lighting fixture 210. Grommets 224 may surround, or substantially surround, the wiring harness extending through openings 228. First wiring harness 150 may be attached to an inner surface of first lighting fixture 208 and second wiring harness 150a may be attached to an inner surface of second lighting fixture 210 with ties 232. First and second lighting fixtures 208 and 210 may be closed and first wiring harness 150 may be substantially housed in the first lighting fixture 208 and second lighting wiring harness 150a may be substantially housed in the second lighting fixture 210. For example, the wiring harnesses may only have the wires leading to a connector 156 or 158 extending out from the fixture housing.

NOMENCLATURE electrical connecting system 100
lighting fixtures 108, 110, 112
wiring harness 102, 104, 106
power adapter 114+
electrical lines 115
wiring harness connector 116, 118
sole external power supply lines 121
sole dimmer control lines 123
Dimmer (N) 120
Dimmer (L) 122
Ground 124
AC line (N) 126
AC line (L) 128
Dimmer (N), from wiring harness 120a
Dimmer (L), from wiring harness 122a
Ground, from wiring harness 126a
AC line (N), from wiring harness 124a AC line (L), from wiring harness 128*a*
Dimmer (N), fixture 120*b*
Dimmer (L), fixture 122*b*
Ground, fixture 126*b*
AC line (N), fixture 124*b*
AC line (L), fixture 128*b*
Dimmer (N), external 120*c*
Dimmer (L), external 122*c*
Ground, external 126*c*
AC line (N), external 124*c*
AC line (L), external 128*c*
wiring harness 150
second wiring harness 150*a*
dimmer control adapter 152
power adapter 154
electrical lines 155
wiring harness connector 156
wiring harness connector 158
lighting fixtures 208, 210
lamp 209, 211
sole external power supply lines 221
dimmer controls 223
grommet 224
driver 225
knockout 226
opening 228
bracket 230
tie 232

The invention claimed is:

1. An electrical connecting system configured to electrically connect a plurality of lighting fixtures to one another and a sole external power supply, the electrical connecting system comprising;
   a first wiring harness being configured to electrically connect with the sole external power supply and a first lighting fixture, the first wiring harness comprising:
   a first wiring harness connector; and
   a first power adapter;
   the first wiring harness connector and the first power adapter being in electrical connection with one another;
   a second wiring harness being configured to electrically connect with a second lighting fixture and the first wiring harness, the second wiring harness comprising:
   a second wiring harness connector; and
   a second power adapter;
   the second wiring harness connector and the second power adapter being in electrical connection with one another;
   each of the lighting fixtures, in the plurality of lighting fixtures, comprises at least one lamp;
   the first power adapter being configured to electrically communicate with each of the lamps in the first lighting fixture and the second power adapter being configured to electrically communicate with each of the lamps in the second lighting fixture;
   the first wiring harness connector being configured to electrically connect with the second wiring harness connector;
   the electrical connecting system being configured to supply power to each lamp, in the plurality of lighting fixtures, with the sole external power supply; and
   wherein the first wiring harness further comprises a first dimmer adapter and the second wiring harness further comprises a second dimmer adapter, the first dimmer adapter being configured to electrically connect with a sole external dimming controller and electrically communicate with each of the at least one lamp in the first lighting fixture, the second dimmer adapter being configured to electrically communicate with each of the at least one lamp in the second lighting fixture, the first dimmer adapter and the second dimmer adapter being configured to electrically connect with one another, the first dimmer adapter and the second dimmer adapter are configured to control dimming of each of the lamps, in the plurality of lighting fixtures, with the sole external dimmer control.

2. The electrical connecting system of claim 1, wherein the first wiring harness and the second wiring harness have the same configuration.

3. The electrical connecting system of claim 1 configured to electrically connect at least 20 lighting fixtures together and illuminate each of the lamps in the at least 20 lighting fixtures, with the power supplied with the sole external power supply.

4. The electrical connecting system of claim 1, wherein the first wiring harness is configured to be substantially housed in the first lighting fixture and the second wiring harness is configured to be substantially housed in the second lighting fixture.

5. The electrical connecting system of claim 1, wherein the first lighting fixture and the second lighting fixture are strip fixtures, the first wiring harness and the second wiring harness are configured electrically connect the first strip fixture abutted with the second strip fixture.

6. The electrical connecting system of claim 1 being configured to space the first wiring harness connector a distance of at least 4 feet from the second wiring harness connector.

7. The electrical connecting system of claim 1, wherein the first wiring harness connector and the second wiring harness connector have mating plugs.

8. An electrical connecting system configured to electrically connect a plurality of lighting fixtures to one another and a sole external power supply, the electrical connecting system comprising;
   a first wiring harness being configured to electrically connect with the sole external power supply and a first lighting fixture, the first wiring harness comprising:
   a first wiring harness connector; and
   a first power adapter;
   the first wiring harness connector and the first power adapter being in electrical connection with one another;
   a second wiring harness being configured to electrically connect with a second lighting fixture and the first wiring harness, the second wiring harness comprising:
   a second wiring harness connector; and
   a second power adapter;
   the second wiring harness connector and the second power adapter being in electrical connection with one another;
   each of the lighting fixtures, in the plurality of lighting fixtures, comprises at least one lamp;
   the first power adapter being configured to electrically communicate with each of the lamps in the first lighting fixture and the second power adapter being configured to electrically communicate with each of the lamps in the second lighting fixture;
   the first wiring harness connector being configured to electrically connect with the second wiring harness connector;

the electrical connecting system being configured to supply power to each lamp, in the plurality of lighting fixtures, with the sole external power supply; and wherein the first wiring harness is configured to be substantially housed in the first lighting fixture and the second wiring harness is configured to be substantially housed in the second lighting fixture.

9. The electrical connecting system of claim 8, wherein the first wiring harness further comprises a first dimmer adapter and the second wiring harness further comprises a second dimmer adapter, the first dimmer adapter being configured to electrically connect with a sole external dimming controller and electrically communicate with each of the at least one lamp in the first lighting fixture, the second dimmer adapter being configured to electrically communicate with each of the at least one lamp in the second lighting fixture, the first dimmer adapter and the second dimmer adapter being configured to electrically connect with one another, the first dimmer adapter and the second dimmer adapter are configured to control dimming of each of the lamps, in the plurality of lighting fixtures, with the sole external dimmer control.

10. The electrical connecting system of claim 8, wherein the first lighting fixture and the second lighting fixture are strip fixtures, the first wiring harness and the second wiring harness are configured electrically connect the first strip fixture abutted with the second strip fixture.

11. The electrical connecting system of claim 8, wherein the first wiring harness and the second wiring harness have the same configuration.

12. The electrical connecting system of claim 8 configured to electrically connect at least 20 lighting fixtures together and illuminate each of the lamps in the at least 20 lighting fixtures, with the power supplied with the sole external power supply.

13. The electrical connecting system of claim 8 being configured to space the first wiring harness connector a distance of at least 4 feet from the second wiring harness connector.

14. The electrical connecting system of claim 8, wherein the first wiring harness connector and the second wiring harness connector have mating plugs.

15. An electrical connecting system configured to electrically connect a plurality of lighting fixtures to one another and a sole external power supply, the electrical connecting system comprising;
a first wiring harness being configured to electrically connect with the sole external power supply and a first lighting fixture, the first wiring harness comprising:
a first wiring harness connector; and
a first power adapter;
the first wiring harness connector and the first power adapter being in electrical connection with one another;
a second wiring harness being configured to electrically connect with a second lighting fixture and the first wiring harness, the second wiring harness comprising:
a second wiring harness connector; and
a second power adapter;
the second wiring harness connector and the second power adapter being in electrical connection with one another;
each of the lighting fixtures, in the plurality of lighting fixtures, comprises at least one lamp;
the first power adapter being configured to electrically communicate with each of the lamps in the first lighting fixture and the second power adapter being configured to electrically communicate with each of the lamps in the second lighting fixture;
the first wiring harness connector being configured to electrically connect with the second wiring harness connector;
the electrical connecting system being configured to supply power to each lamp, in the plurality of lighting fixtures, with the sole external power supply; and
wherein the first lighting fixture and the second lighting fixture are strip fixtures, the first wiring harness and the second wiring harness are configured electrically connect the first strip fixture abutted with the second strip fixture.

16. The electrical connecting system of claim 15, wherein the first wiring harness connector is configured to extend through adjacent knockout openings in the ends of the abutted first and second strip fixtures.

17. The electrical connecting system of claim 15, wherein the first wiring harness further comprises a first dimmer adapter and the second wiring harness further comprises a second dimmer adapter, the first dimmer adapter being configured to electrically connect with a sole external dimming controller and electrically communicate with each of the at least one lamp in the first lighting fixture, the second dimmer adapter being configured to electrically communicate with each of the at least one lamp in the second lighting fixture, the first dimmer adapter and the second dimmer adapter being configured to electrically connect with one another, the first dimmer adapter and the second dimmer adapter are configured to control dimming of each of the lamps, in the plurality of lighting fixtures, with the sole external dimmer control.

18. The electrical connecting system of claim 15, wherein the first wiring harness is configured to be substantially housed in the first lighting fixture and the second wiring harness is configured to be substantially housed in the second lighting fixture.

19. The electrical connecting system of claim 15, wherein the first wiring harness and the second wiring harness have the same configuration.

20. The electrical connecting system of claim 15 configured to electrically connect at least 20 lighting fixtures together and illuminate each of the lamps in the at least 20 lighting fixtures, with the power supplied with the sole external power supply.

* * * * *